Dec. 5, 1961   E. C. WATT ET AL   3,011,845
HYDRAULIC ACTUATOR SHAFT SEAL
Filed Oct. 6, 1959
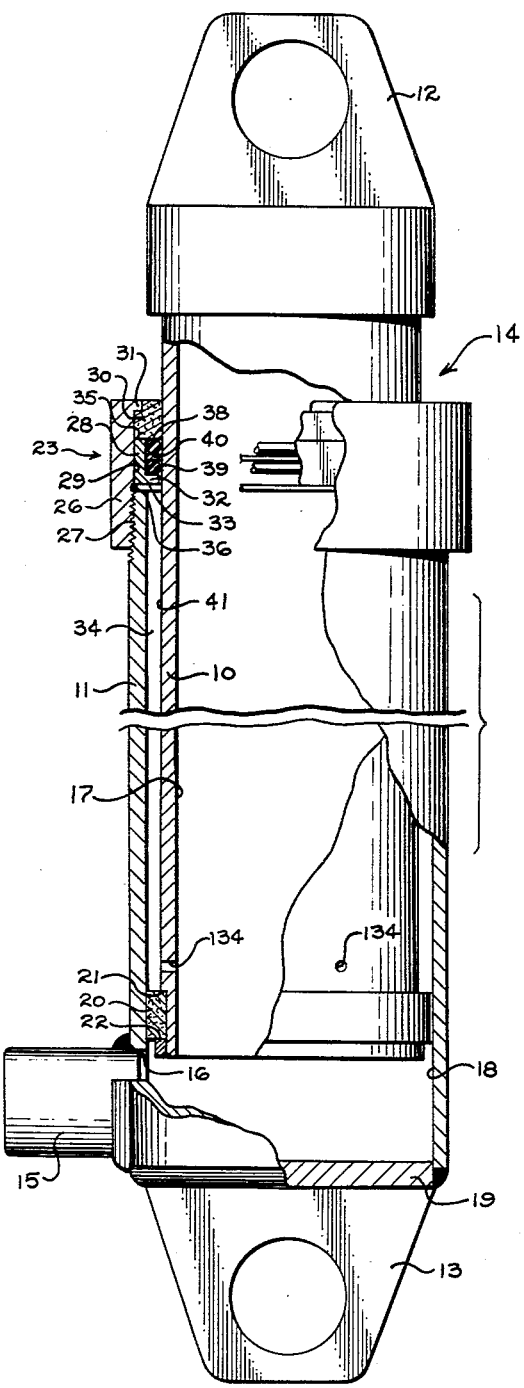
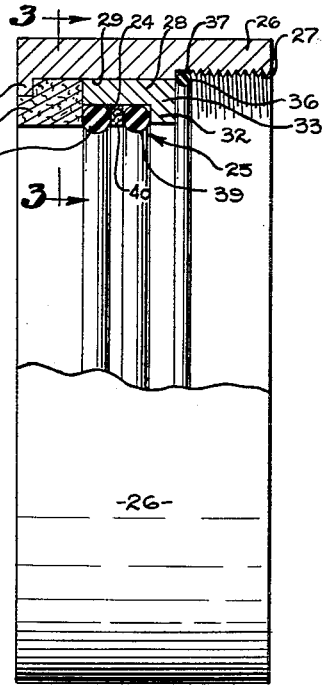
EVERETT C. WATT
LYNN A. WATT
INVENTORS
BY White & Haefliger
ATTORNEYS

United States Patent Office 3,011,845
Patented Dec. 5, 1961

3,011,845
HYDRAULIC ACTUATOR SHAFT SEAL
Everett C. Watt, 162 Kaiulani St., and Lynn A. Watt,
82 Halai St., both of Hilo, Hawaii
Filed Oct. 6, 1959, Ser. No. 844,677
5 Claims. (Cl. 309—2)

This invention relates generally to improvements in actuators incorporating cylinder and piston members coaxially relatively movable in response to fluid pressure exerted within the cylinder and piston members. More particularly, the invention concerns such improvements having to do with sealing off between the piston and cylinder members of such actuators.

In the past rubber O-rings have been mounted on the piston member for moving sealing engagement with the bore of the cylinder during relative axial movement of the piston within the cylinder member. However, where multiple O-rings were used for this purpose, it was found that at least one and oftentimes all of the O-rings would roll about their ring axes in response to such relative movement of the piston and cylinder members, such rolling producing rapid failure of the O-rings and leading to loss of sealing action. In an effort to solve this problem, the O-rings have been mounted on the cylinder so as to be in sliding engagement with the piston or shaft periphery. However, in applications where the shafts of long stroke hydraulic cylinders are extended and exposed to the elements for a period of time the shaft tends to become completely dry so that when subsequently drawn through the O-rings the latter, being dry, tend to roll until failure occurs. Also, where high fluid pressure exists in such actuators, the O-rings tend to extrude through small clearances if they are free to move about in the groove within which they are normally retained, such extrusion leading to rapid failure of the seal.

The present invention contemplates a novel solution of the above problems through the provision of a seal assembly of such construction that the O-rings will not roll about their ring axes in response to relative movement of the cylinder and piston members, nor will they extrude under pressures which would be otherwise effective to cause extrusion of O-ring seals constructed according to past or prior known designs. More specifically, the invention contemplates the provision of means forming an annular groove that remains coaxially stationary with respect to one of the actuator members and radially exposed to the other member, and a seal assembly in the groove including a pair of coaxially spaced apart elastomer O-rings and an oil impregnated pliable annulus in the space between the O-rings. The annulus and O-rings are in axially compressive interengagement, and are also in radially compressive sealing engagement with the piston and cylinder members, with the result that the O-rings remain continuously lubricated by the pliable annulus to prevent rolling about their ring axes during relative axial movement of piston and cylinder members.

Preferably, the pliable annulus comprises leather, and the O-rings and leather annulus are located in a groove stationary with respect to the cylinder member, the O-rings and annulus having such interference with the periphery of the piston member or shaft that they are compressively deformed to fill substantially the entire groove in which they are retained. Accordingly, the O-rings are not freely movable within the groove and they are not subject to extrusion from the groove under pressures which would ordinarily extrude them were they bodily movable within the groove.

Another object of the invention is to provide in an actuator having such an improved seal assembly, an oil absorbent non-metallic annular bearing bushing at the axial end of the groove toward which fluid pressure tends to force the seal assembly, the bushing having a close sliding fit with the piston member throughout the engagement circumference. Preferably the bushing comprises a molded fabric and may be of the type known in the trade as a Gatke fabric bushing, which adjusts itself to the shape and size of the piston and of the cylinder, which can be out of round as much as forty thousandths of an inch without malfunctioning of the bushing. The latter is capable of distortion by side and radial thrust of the piston, and furthermore, the distorted bushing immediately re-forms itself to maintain desirable close fit with the piston surface, preventing extrusion of the seal or O-rings through the clearances. In addition, such a bushing will not gall the piston or cylinder surfaces as would a bearing bushing under severe side or radial thrust loading.

These and other objects and advantages of the invention, as well as the details of an illustrative embodiment, will be more fully understood from the following detailed description of the drawings, in which:

FIG. 1 is an elevation partly in section and partly broken away, showing the actuator with the seal assembly sealing off between the piston and cylinder members;

FIG. 2 is an enlarged section showing the detailed construction of the means forming the annular groove within which the seal assembly is located; and FIG. 3 is an enlarged fragmentary sectional view taken on line 3—3 of FIG. 2.

The tubular piston and cylinder members are respectively shown at 10 and 11 with attachment fittings 12 and 13 at their closed ends, thereby forming the hydraulic actuator 14 as shown. Hydraulic fluid enters the cylinder through the duct 15 and cylinder side opening 16, the fluid filling the piston bore 17 and the cylinder bore 18 at opposite sides of the molded fabric Gatke bushing 20. The latter is mounted on the piston between the piston shoulder 21 and a retaining ring 22 welded to the piston, and it aligns the cylinder and the piston during their relative axial movements. Bushing 20 also serves as a bearing for guiding the piston in the cylinder during relative axial movement thereof. Fluid has access to the space 34 between the piston and cylinder walls through the openings 134 in the piston wall.

The actuator includes an improved packing assembly typically in the form of the means shown at 23 forming an annular groove 24 that remains stationary with respect to the cylinder member 11, for receiving a seal assembly generally indicated at 25. The means 23 includes a metal cap 26 threaded at 27 to the free end of the cylinder, a metal spacer 28 having a sliding fit with the bore 29 of the cap, and a molded fabric Gatke bushing 30 received within the bore 29 of the cap and retained therein by an internal cap flange 31. The spacer 28 has an internal flange 32 presenting a shoulder 33 in the direction of fluid pressure application between the bushing 20 and the cylinder 11 into the space 34 between the piston and cylinder members so that such pressure forces the spacer 28 against the fabric bushing 30 at the location 35, thereby to form a tight seat between the spacer and the bushing 30. Such pressure also fits the bushing to the often out-of-round piston surface 41. An O-ring 36 seals off between the cap 26 and the cylinder 11, the O-ring being retained in a groove 37 as shown in FIG. 2. The O-ring 36 also seals off between the cap 26 and spacer 28, and thus serves a double duty.

The seal assembly in the groove 24 includes a number of coaxially spaced apart rubber O-rings 38 and 39, and an oil impregnated pliable annulus 40 in the space between the O-rings, the annulus preferably comprising leather. Before the piston 10 is introduced into the cylinder, the O-rings and annulus appear as shown in FIG. 2, with their inner diameters slightly less than the inner diameters of the fabric bushing 30. When the piston is introduced into the cylinder, the annulus and O-rings 38 and 39 are compressively deformed to fill substantially the entire groove 24 between the bushing 30 and the flange 32 of spacer 28, the annulus and O-rings being in axially compressive interengagement and in radially compressive sealing engagement with the piston surface 41 and the groove wall 24, as illustrated in FIG. 1.

As a result of the foregoing construction, the O-rings 38 and 39 are continuously lubricated by the annulus to prevent rolling thereof about their ring axes during relative axial movement of the piston and cylinder members, even though the piston surface is dry, such as occurs after long exposure of the piston in fully extended condition. It is found that the leather annulus remains impregnated with oil, and as soon as the least bit of oil is applied to the O-rings by the annulus the piston shaft slides through the O-rings with no rolling resulting. Further, the pliable annulus, together with the O-rings, are compressible to fill the complete void or groove space leaving no room for extrusion of the annulus or the O-rings from that space. Such extrusion pressure develops when hydraulic fluid actuating pressure builds up between the closed end 19 of the cylinder and the top cap 12, and likewise in space 34 to be exerted against the seal assembly 25 including the O-rings 39 separated by annulus 40. As the leather annulus wears, it continues to leave no space wherein the O-rings might extrude, such as could occur were a rigid metallic annulus or separator used.

Furthermore, the multiple assembly described above as located in a single groove 24 is a decided improvement over a single O-ring seal with or without a metallic back-up washer, since with the latter there results under extreme pressure an extrusion of the rubber O-ring to the extent that with any sidewise pressure or irregularity in the cylinder or piston walls a portion of the O-ring is cut off, with premature failure resulting. In a multiple O-ring seal assembly in which a pliable annulus separates the O-rings, it is found that the pressures are transferred and transmitted uniformly and jointly by all of the O-rings, so that the seal assembly has a much longer life and is in fact a better seal. In particular, such a multiple O-ring and pliable annulus assembly has been found much better under conditions where the cylinder and piston walls are misaligned in an actuator, in that there is much less oil leakage to the extent that the piston surface exposed at the exterior appears dry.

We claim:

1. For combination in actuator apparatus of the character described including concentric inner and outer members coaxially relatively movable and between which fluid pressure is receivable, said members at times being subject to axial misalignment, an improved packing gland and bushing assembly at the terminal end of one of said members for preventing escape of said fluid pressure from between said members while guiding said members relative movement and accommodating said misalignment, said assembly including a tubular cap detachably carried by said one member, a relatively rigid non-metallic annular bushing retained in the space between said cap and the other of said members, spacer means against which said fluid pressure is applicable and movable in said space to transmit said pressure to said bushing acting to fit the bushing to said other member, said means forming an annular groove facing said other member, and a seal assembly in said groove for sealing off between said means and said other member at the fluid pressure side of said bushing.

2. The invention as defined in claim 1 in which said seal assembly includes coaxially spaced apart elastomer O-rings and lubricant impregnated pliable annulus means in said space between said O-rings, said O-rings and pliable annulus being held in axially compressive interengagement by said spacer means and said bushing.

3. The invention as defined in claim 2 in which said pliable annulus comprises leather and said bushing comprises molded fabric.

4. The invention as defined in claim 2 in which said O-rings and pliable annulus remain compressively deformed to fill substantially the entire groove.

5. The invention as defined in claim 1 in which said outer member and cap have threaded interconnection whereby said packing gland and bushing assembly is axially removable for replacement of said seal assembly.

References Cited in the file of this patent

UNITED STATES PATENTS

| | | |
|---|---|---|
| 451,209 | Ellithorpe | Apr. 28, 1891 |
| 917,690 | Weese | Apr. 6, 1909 |
| 2,430,836 | Taylor | Nov. 11, 1947 |
| 2,437,814 | Hallen | Mar. 16, 1948 |
| 2,649,077 | Mehm | Aug. 18, 1953 |
| 2,692,584 | Armington et al. | Oct. 26, 1954 |
| 2,797,971 | Greenough | July 2, 1957 |
| 2,832,650 | Park | Apr. 29, 1958 |
| 2,844,421 | Hayman | July 22, 1958 |
| 2,860,019 | Osmun | Nov. 11, 1958 |
| 2,942,582 | Dempster et al. | June 28, 1960 |